M. B. FETCHER.
UNIVERSAL JOINT.
APPLICATION FILED AUG. 12, 1916.

1,286,267.

Patented Dec. 3, 1918.
2 SHEETS—SHEET 1.

INVENTOR
Martin B. Fetcher
BY Ralzemond A. Parker
ATTORNEY

M. B. FETCHER.
UNIVERSAL JOINT.
APPLICATION FILED AUG. 12, 1916.

1,286,267.

Patented Dec. 3, 1918.
2 SHEETS—SHEET 2.

INVENTOR
Martin B. Fetcher
BY Ralzemond A. Parker
ATTORNEY

UNITED STATES PATENT OFFICE.

MARTIN B. FETCHER, OF DETROIT, MICHIGAN, ASSIGNOR OF ONE-HALF TO LEONARD A. YOUNG, OF HIGHLAND PARK, MICHIGAN.

UNIVERSAL JOINT.

1,286,267.  Specification of Letters Patent.  Patented Dec. 3, 1918.

Application filed August 12, 1916.  Serial No. 114,505.

*To all whom it may concern:*

Be it known that I, MARTIN B. FETCHER, a citizen of the United States, residing at Detroit, county of Wayne, State of Michigan, have invented a certain new and useful Improvement in Universal Joints, and declare the following to be a full, clear, and exact description of the same, such as will enable others skilled in the art to which it pertains to make and use the same, reference being had to the accompanying drawings, which form a part of this specification.

This invention relates to universal joints and has for its object a universal joint designed to be constructed in such a way that the parts may be very quickly, cheaply and easily made. The pins upon which the parts of the universal joints pivot are designed to be of uniform diameter which is made possible by the construction hereinafter described.

In the drawings,—

Figure 1:
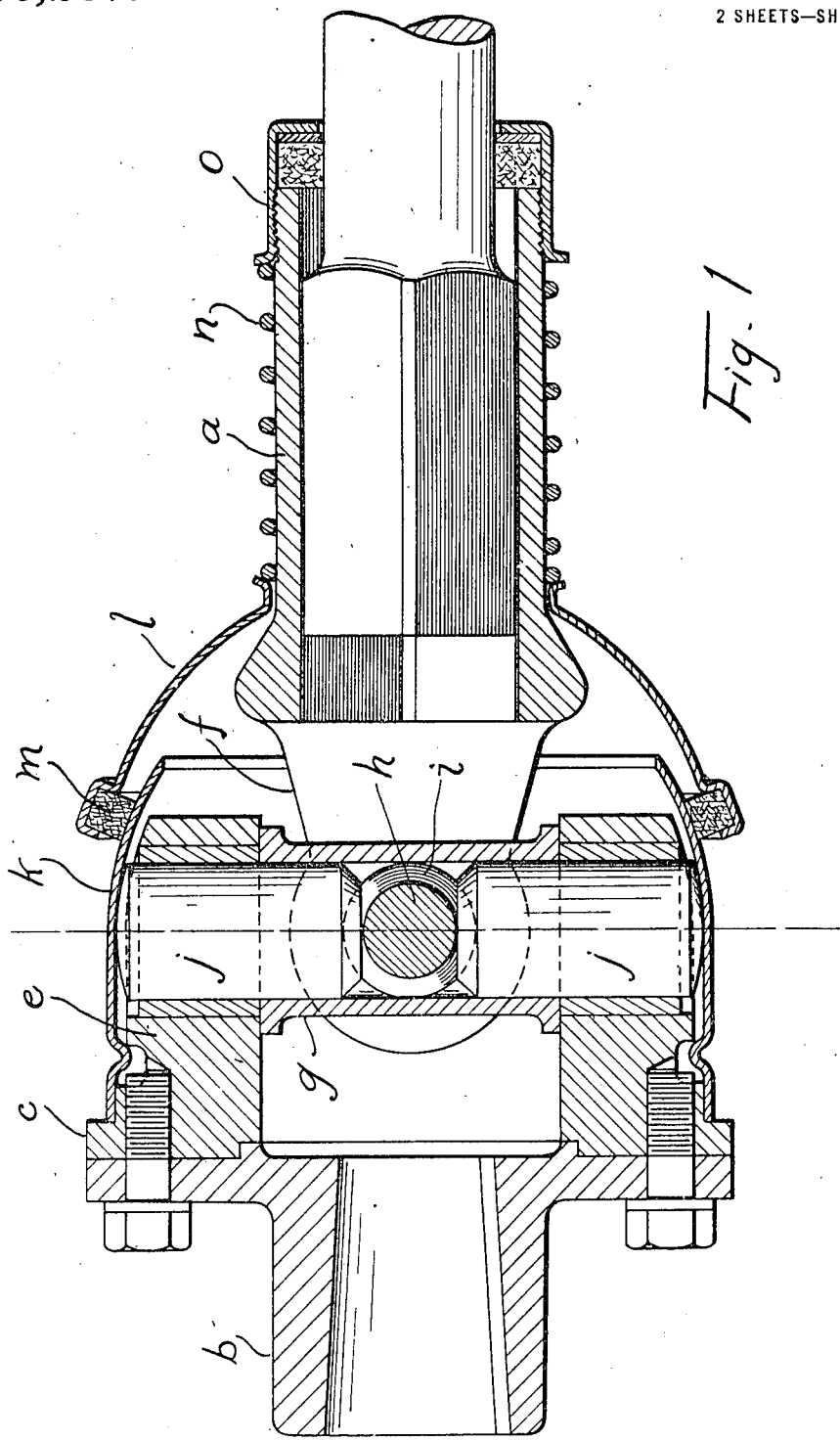
Figure 1 is a longitudinal section of the joint.

In the joint shown in Fig. 1, the shaft end is squared and has a sliding engagement in the sleeve $a$, which is square in cross section on its inside. The other shaft will have a tapered fit into the annular-flanged socket $b$. To the flange of this socket $b$ is bolted the annulus $c$ provided with the integral lugs $e$ which form the bearings of one yoke for the joint. The other bearing or yoke $f$ is an integral part of the sleeve $a$. A forging $g$ forms the drilled spider which holds the pins at the center of the joint.

One pin $h$ goes clear through the spider and has its mid portion cut out so that it has a reduced diameter so connected with the portions of larger diameter as to form beveled shoulders $i$ which are beveled on an angle of 45°. The other pin is made up of two pins in reality, $j, j$, which are chamfered off at their inner ends at an angle of 45° to fit into the beveled shoulders of the pin $h$. The two-part pin $j, j$ is held in place by the pin $h$ and the usual housing $k$ which is crimped into a groove in the annulus $c$. When it is desired to disassemble the joint, the housing $k$ is removed and the short pins driven out by driving the long pin $h$ against the 45° angle on the shoulders, of short pins serving to expel the two short pins $j, j$.

The advantage of this pin construction is that the pins can be made very cheaply, the one pin being cut away midway its length at small expense. All the pins can be made upon an automatic machine. This construction has the further advantage of not requiring the drilling of one of the pins, which is the customary construction of universal joints to-day, this being a somewhat expensive operation and at the same time considerably weakening the pin. The drilled-pin construction has the disadvantage of requiring one pin to be smaller than the other pin so that it can be driven through the transverse hole drilled in the other pin. This results in one pin having a small bearing surface and the other pin having a relatively large bearing surface. In my construction the pins have both the same bearing surface.

The housing $k$ has the usual spherical curvature on one end of the same. The part-spherical shell $l$ is provided to complete the inclosure of the joint. This part-spherical shell $l$ is provided with the usual packing ring $m$ which is always packed tightly against the spherical surface of the housing $k$ by means of the coiled spring $n$.

Figure 2:
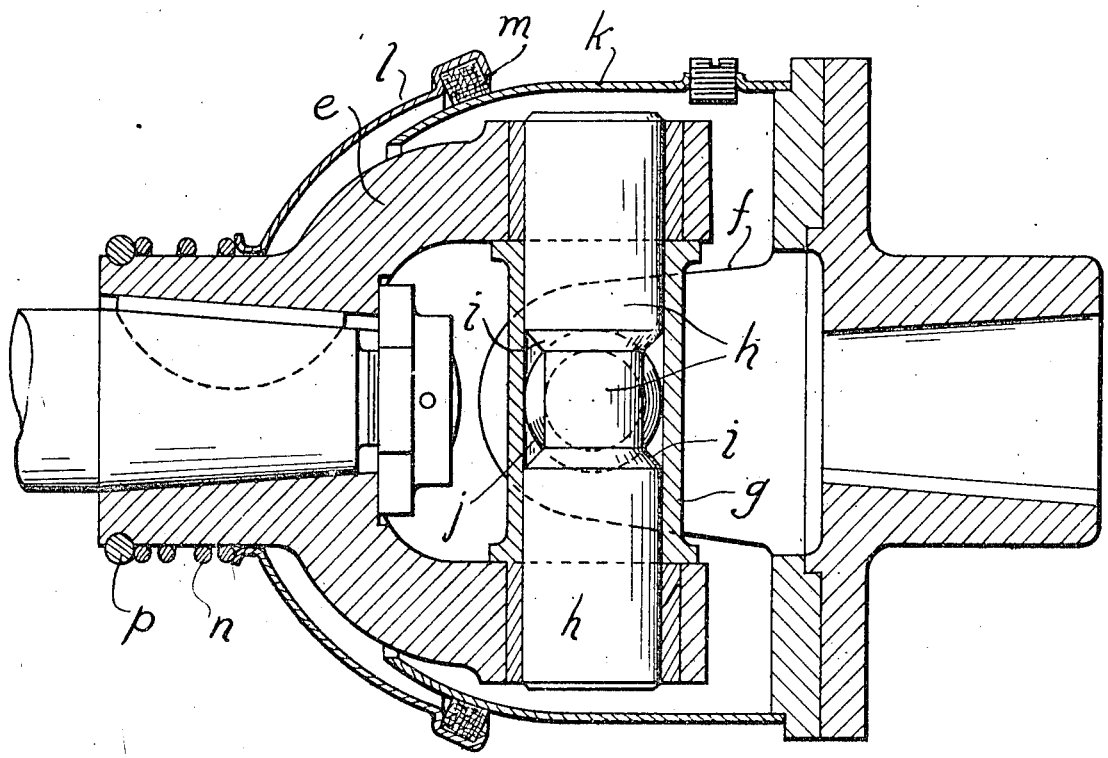
Fig. 2 is a longitudinal section of a slightly modified form of joint, the section being taken on a plane 90° removed from the plane of Fig. 1.
Figure 3:
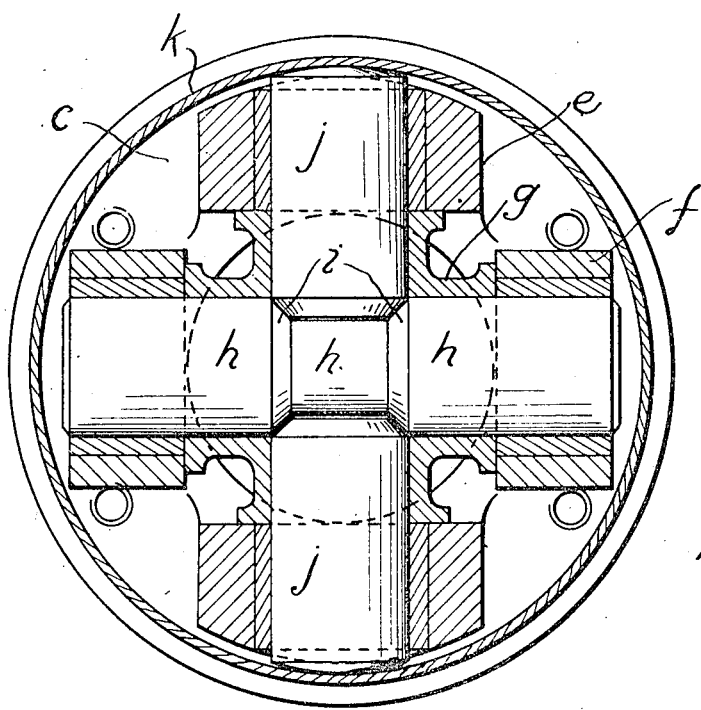
Fig. 3 is a cross section of the joint.

In Fig. 2 I have shown a slightly different form of construction and in place of the sleeve $a$ having the square fit with the shaft end, I have shown a sleeve having a tapering socket. In place of the threaded cap $o$ which adjusts the tension of the spring $n$ I have shown a split ring $p$ which serves as an abutment for one end of the spring.

What I claim is:

1. In a universal joint, the combination of a housing, a driven member provided with a pair of bearings, a driving member provided with a pair of bearings, a solid pin reaching from bearing to bearing and annularly cut away at its mid portion and having shoulders between the cut-away portion and the main portion beveled at an angle of 45 degrees, a pair of solid pins having their inner ends